United States Patent
Kela et al.

(10) Patent No.: US 11,870,528 B2
(45) Date of Patent: Jan. 9, 2024

(54) MACHINE LEARNING IN BEAM SELECTION

(71) Applicant: NOKIA TECHNOLOGIES OY, Espoo (FI)

(72) Inventors: Kalle Petteri Kela, Kaarina (FI); Teemu Mikael Veijalainen, Helsinki (FI); Hans Thomas Höhne, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/725,508

(22) Filed: Apr. 20, 2022

(65) Prior Publication Data
US 2023/0344496 A1 Oct. 26, 2023

(51) Int. Cl.
*H04B 7/06* (2006.01)
*H04W 24/10* (2009.01)
*H04B 17/318* (2015.01)

(52) U.S. Cl.
CPC ......... *H04B 7/0639* (2013.01); *H04B 7/0695* (2013.01); *H04B 17/318* (2015.01); *H04W 24/10* (2013.01)

(58) Field of Classification Search
CPC .. H04B 7/0695; H04B 7/0617; H04B 17/318; H04W 24/10
USPC ........................................ 375/262, 267, 299
See application file for complete search history.

(56) References Cited

U.S. PATENT DOCUMENTS

| | | | |
|---|---|---|---|
| 10,812,992 B1* | 10/2020 | Tran .................. | H04B 17/12 |
| 2010/0215034 A1* | 8/2010 | Klein ................ | H04W 28/0231 370/352 |
| 2020/0337101 A1* | 10/2020 | Brooks .............. | H04W 64/00 |
| 2020/0412438 A1 | 12/2020 | Yang et al. | |
| 2021/0167875 A1* | 6/2021 | Shen .................. | H04B 7/0695 |
| 2021/0314270 A1* | 10/2021 | Dalmiya ............. | H04L 41/16 |

(Continued)

FOREIGN PATENT DOCUMENTS

| WO | 2020/030137 A1 | 2/2020 |
|---|---|---|
| WO | 2021/093213 A1 | 5/2021 |
| WO | WO-2022013665 A1 * | 1/2022 |

OTHER PUBLICATIONS

3GPP TS 38.213 V17.0.0 (Dec. 2021), Technical Specification, 3rd Generation Partnership Project; Technical Specification Group Radio Access Network; NR; Physical layer procedures for control (Release 17), Dec. 2021.

(Continued)

*Primary Examiner* — Emmanuel Bayard
(74) *Attorney, Agent, or Firm* — SQUIRE PATTON BOGGS (US) LLP

(57) ABSTRACT

Systems, methods, apparatuses, and computer program products for beam selection using data radio bearer specific machine learning are provided. For example, a method can include providing one or more inputs regarding a plurality of beams to a machine learning model. The method can also include obtaining at least one output value regarding the plurality of beams from the machine learning model. The machine learning model can be a data radio bearer specific machine learning model, a data radio bearer group specific machine learning model, or a model trained to output selectively data radio bearer specific values or data radio bearer group specific values.

20 Claims, 10 Drawing Sheets

(56) References Cited

U.S. PATENT DOCUMENTS

| | | | | |
|---|---|---|---|---|
| 2021/0336682 A1* | 10/2021 | Pezeshki | .............. | H04B 7/0617 |
| 2022/0029286 A1* | 1/2022 | Cho | .................... | H04B 10/695 |
| 2022/0361037 A1* | 11/2022 | Wei | .................. | H04W 28/0268 |
| 2023/0144085 A1* | 5/2023 | Dutta | .................... | H04B 7/0617 |
| | | | | 342/350 |
| 2023/0231779 A1* | 7/2023 | Centonza | .............. | H04W 24/10 |
| | | | | 370/252 |

OTHER PUBLICATIONS

Rafail Ismayilov et al., "Adaptive Beam-Frequency Allocation Algorithm with Position Uncertainty for Millimeter-Wave MIMO Systems", University of Goettingen, Goettingen, Germany, National Institute of Informatics, Tokyo, Japan, Nippon Institute of Technology, Saitama, Japan, and Niigata University, Niigata, Japan, downloaded by Nokia on May 30, 2023 from IEEE Xplore, 5 pages.

Li-Hsiang Shen et al., "Joint Beam and Subband Resource Allocation with QoS Requirement for Millimeter Wave MIMO Systems", National Chiao Tung University, Hsinchu, Taiwan, Nokia downloaded on May 30, 2023 from IEEE Xplore, 6 pages.

Xuyao Sun et al., "Beam Training and Allocation for Multiuser Millimeter Wave Massive MIMO Systems", IEEE Transactions on Wireless Communications, vol. 18, No. 2, Feb. 2019, http://www.ieee.org/publications_standards/publications/rights/index.html, DOI:10.1109/TWC.2018.2889071, 13 pages.

Min Soo Sim et al., "Deep Learning-Based mmWave Beam Selection for 5G NR/6G With Sub-6 GHz Channel Information: Algorithms and Prototype Validation", IEEE Access, Special Section on Artificial Intelligence for Physical-Layer Wireless Communications, DOI: 10.1109/ACCESS.2020.2980285, 13 pages.

International Search Report and Written Opinion issued in corresponding International Patent Application No. PCT/EP2023/060121 dated Jul. 6, 2023.

Chunfeng Wang et al., "Beamforming of Simultaneous Wireless Energy and Information Transmission System Based on Reinforcement Learning", 2019 IEEE International Conference on Power, Intelligent computing and Systems (ICPICS), 5 pages.

* cited by examiner

US 11,870,528 B2

MACHINE LEARNING IN BEAM SELECTION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing beam selection using data radio bearer specific machine learning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to provide one or more inputs regarding a plurality of beams to a machine learning model. The at least one memory and computer program code can also be configured, with the at least one processor, to cause the apparatus at least to obtain at least one output value regarding the plurality of beams from the machine learning model. The machine learning model can be a data radio bearer specific machine learning model, a data radio bearer group specific machine learning model, or a model trained to output selectively data radio bearer specific values or data radio bearer group specific values.

An embodiment may be directed to a method. The method can include providing one or more inputs regarding a plurality of beams to a machine learning model. The method can also include obtaining at least one output value regarding the plurality of beams from the machine learning model. The machine learning model can be a data radio bearer specific machine learning model, a data radio bearer group specific machine learning model, or a model trained to output selectively data radio bearer specific values or data radio bearer group specific values.

An embodiment may be directed to an apparatus. The apparatus can include means for providing one or more inputs regarding a plurality of beams to a machine learning model. The apparatus can also include means for obtaining at least one output value regarding the plurality of beams from the machine learning model. The machine learning model can be a data radio bearer specific machine learning model, a data radio bearer group specific machine learning model, or a model trained to output selectively data radio bearer specific values or data radio bearer group specific values.

BRIEF DESCRIPTION OF THE DRAWINGS

For proper understanding of example embodiments, reference should be made to the accompanying drawings, wherein.

DETAILED DESCRIPTION

Figure 1:
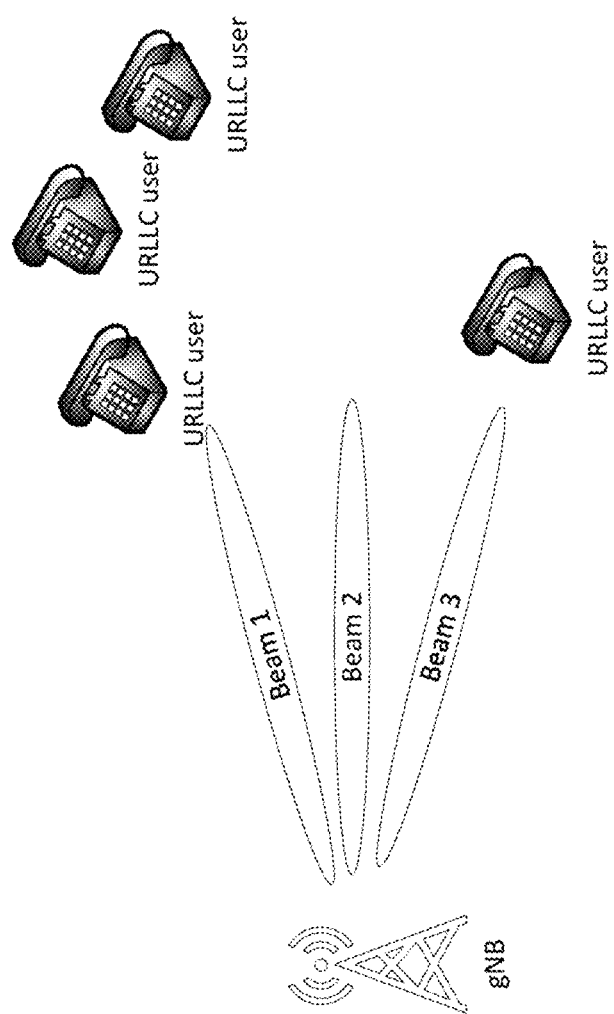
FIG. 1 illustrates a seemingly inefficient or inequitable beam service arrangement.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing beam selection using data radio bearer specific machine learning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to fifth generation (5G) new radio (NR) beam measurements and beam reporting while in radio resource control (RRC) connected mode. In 5G NR, a user equipment (UE) can report measurement quantities that are used by the gNB to determine the beam to be used for serving the UE.

Machine learning (ML)-based beam selection may aim to satisfy quality of service (QoS) requirements of a certain QoS class. Certain approaches to ML-based beam selection may focus on obtaining highest achievable signal quality. In such an approach, the best beam may refer to a beam that yields the strongest signal, least interference, highest signal to interference plus noise ratio (SINR), reference signal received power (RSRP), reference signal received quality (RSRQ), or some other beam quality measurement quantity.

Certain embodiments use machine learning differently. Reinforcement learning methods called Q-learning and deep Q network (DQN) can be utilized for purposes of illustration of the principles of certain embodiments. However, other models can be utilized as well. Q-learning, DQN, as well as reinforcement learning in general are just examples of machine learning or artificial intelligence methods. Reinforcement learning (RL) can refer to the aspect of machine learning related to the way that intelligent agents perform actions to maximize cumulative reward. In certain embodiments, the actions may be beam selections in states where the states are beam measurement outcomes. As a cumulative reward, throughput of eMBB UEs may be used, rather than strongest signal. Other reward functions may be used for maximization of other key performance indicators.

Traditional beam selection may only take into account reported and/or measured beam measurement quantities, such as SINR, RSRP, RSRQ, or received signal strength indicator (RSSI). In such beam selection procedures, the beam that provides the best channel conditions based on selected reported/measured quantity may be selected for the UE. If there are a small number of UEs to be served, such an approach may be adequate. However, if load increases and the next generation Node B (gNB) can utilize only one of few beams at a time, then there may be scheduling delays. Such delays may be avoided in various ways. For example, reduced grid of beams (GoB) size may lead to improved ultra-reliable low latency communication (URLLC) results. With suboptimally reduced GoB size, scheduling delays may be minimized without providing excessively poor signals, because more UEs may be scheduled per transmission time interval (TTI) with frequency domain (FD) scheduling. Certain gNBs may perform beam and scheduling candidate selection at time domain (TD) before scheduling UEs to selected beam in FD.

FIG. 1 illustrates a seemingly inefficient or inequitable beam service arrangement. As shown in FIG. 1, beam 1 is serving three user equipment, each identified as an URLLC user, beam 2 is not serving any user equipment, and beam 3 is serving only one user equipment.

Certain embodiments may provide ways to utilize the whole GoB efficiently when, for example, the gNB can schedule only one beam at a time, which may apply to frequency range 2 (FR2) products with limited number of radio frequency (RF) chains.

As discussed above, certain ML methods may try to find a beam that yields the best signal quality. While such a solution may be appropriate for serving a single UE, such an approach may be sub-optimal when there are multiple UEs and multiple QoS classes that should be scheduled with limited number of beams and limited time/frequency domain resources. Accordingly, certain embodiments provide other ways of identifying a beam with ML.

Figure 2:
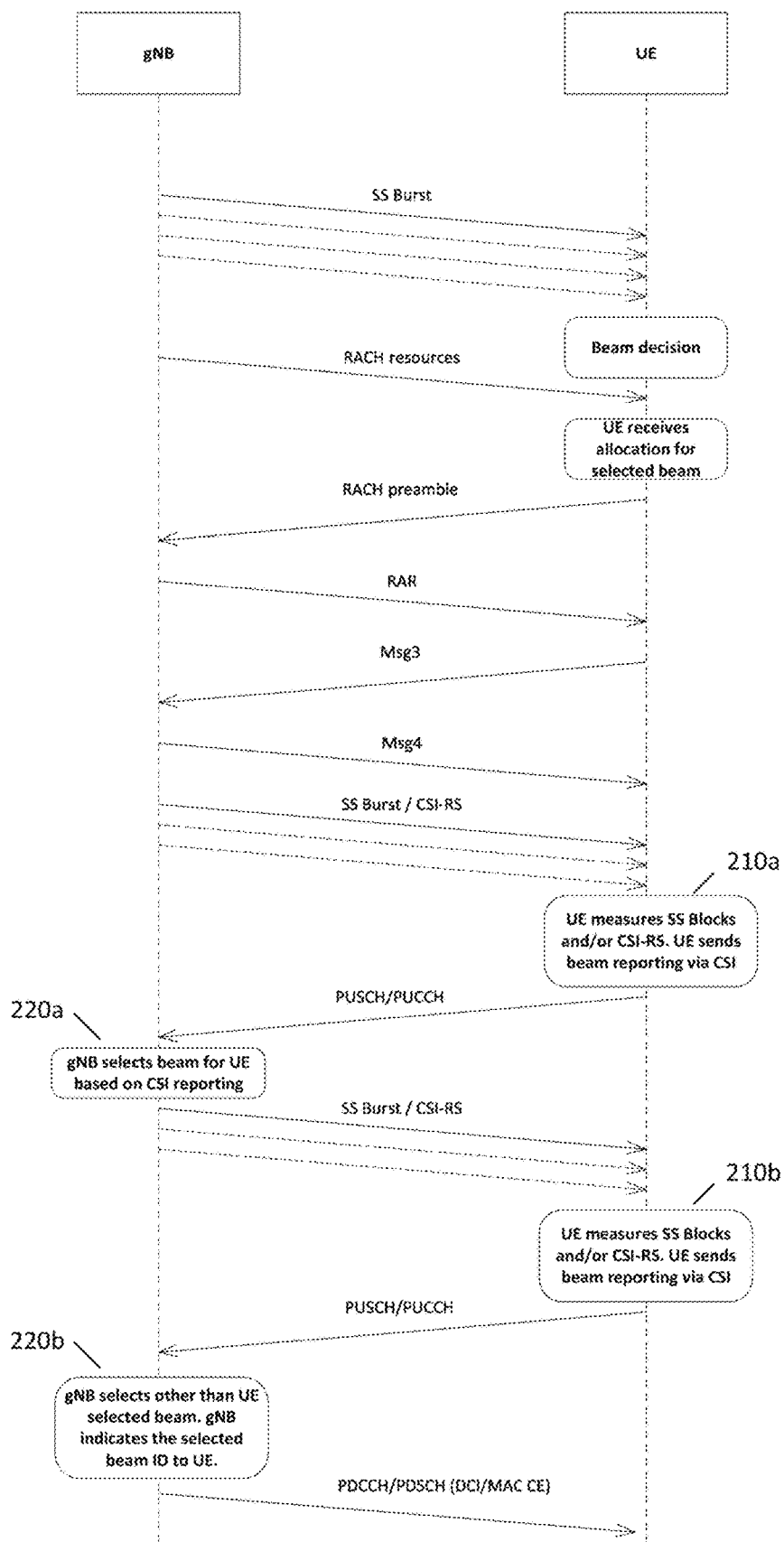
FIG. 2 illustrates beam selection according to certain embodiments.

FIG. 2 illustrates beam selection according to certain embodiments. The approach illustrated in FIG. 2 may be applicable to 5G NR. Proposed ML model based approach can be utilized either at gNB to select other than the best reported beam for the UE or at the UE side for reporting beams suggested by the ML model instead or in addition to channel measurement based selection.

As shown in FIG. 2, there may be a burst of synchronization signals (SS) from a gNB, which may be received and measured at a UE. The UE may make a beam decision based on evaluation of the SS burst. Subsequently the UE may receive random access channel (RACH) resources including an allocation for the selected beam. The UE can send a RACH preamble to the gNB. The gNB may respond with a random access response (RAR). Msg3 and Msg4 of the RACH process can follow.

Later, the gNB may again send an SS burst and/or channel state information reference signal (CSI-RS). At 210a, the UE may measure SS blocks and/or CSI-RS. The UE can also send beam reporting via channel state information (CSI). The UE can communicate with the gNB over physical uplink shared channel (PUSCH) and/or physical uplink control channel (PUCCH). At 220a, the gNB can select the beam for UE based on the CSI reporting.

The gNB may yet again send an SS burst and/or CSI-RS. At 210b, the UE may again measure the SS blocks and/or CSI-RS and may send beam reporting to the gNB using CSI. The UE may communicate again with the gNB over PUSCH/PUCCH. At 220b, the gNB may select a beam other than the UE selected beam. The gNB may indicate the selected beam identifier (ID) to the UE.

There can be at least two options for ML implementation, which can be designated as option #1 and option #2 merely for convenience, and not by way of priority, preference, or anything else.

In option #1, a ML model may be implemented in the gNB. In this option, the gNB may select a beam based on a best beam ID reported by the UE and/or data radio bearer (DRB) or QoS ID for which upcoming data is intended to be transmitted. Other beam ID or measurements reported by the UE may also be used for such selection purposes. The beam may be selected using a beam selection model. The beam selection ML model may be selected by the gNB. This model may be applied at both 220a and at 220b.

In option #2, a ML model may be implemented in the UE. The UE can select candidate beams for ML and may report a beam or beams provided by the ML for a certain DRB. The PUSCH/PUCCH may include a beam ID suggested by the UE's ML model if an ML model is used by the UE. Additionally, the UE may indicate the DRB for which the beam was selected. The UE may also or alternatively indicate any other parameter indicating the intended use of the selection from which, for example, the DRB may be derived. This data may be included both in the PUSCH/PUCCH communication following 210a and the PUSCH/PUCCH communication following 210b.

The PDDCH/PDSCH following 220b can, in either option, include downlink control information (DCI) and/or a medium access control (MAC) control element (CE) or other equivalent downlink control information signaling that can be used to inform the UE about the beam ID that the gNB will use for a certain DRB.

Thus, certain embodiments may use ML to assist gNB transmission (Tx)/reception (Rx) beam selection for UEs. As mentioned above, an ML model can exist in the gNB and/or in the UE as depicted in FIG. 2. In certain embodiments there can be DRB-specific beam selection instead or in addition to a single measurement based beam selection that covers all DRBs. Machine learning may be utilized for obtaining such DRB specific beam selections.

If the UE is an ML agent, as in option #2, then the UE may report a DRB specific beam, for one or more DRBs, instead or in addition to a best measured beam.

If the gNB is the ML agent, as in option #1, then the UE may provide candidate beams for certain DRB, for example for the most latency critical DRB. For example, a certain DRB may have a beam quality threshold, such as RSRP, for candidate beams from which the ML model selects the utilized beam. In certain embodiments, the best beam for latency critical packets, transmitted by corresponding DRB in 5G-NR, may be something other than the best beam defined by interference-related measures. This may be because latency-critical packets may be rather small compared to 5G's available bandwidths. Therefore, a gNB may be able to schedule multiple of those latency-critical packets within a single transmission time interval (TTI) if the same beam can be used for multiple UEs with small packets. Certain embodiments may use ML agents to find such beams in order to reduce latencies and increase network capacity.

In alternative approaches, the UE may assume that the gNB uses the beam UE has reported to be the best one. Hence, if the gNB is selecting another beam than the beam the UE reports, then the gNB may beneficially inform the UE if other than the UE report beam is used for a certain DRB. This information may help the UE in adjusting the UE's transmit/receive filters. For example, the UE may adjust the transmit/receive filters based on the information provided by the gNB when data is transmitted/received for the indicated DRB.

Instead of DRB differentiation, other QoS flow mapping methods can be also or alternatively used. DRBs may be one way to differentiate beam selection strategies.

Third generation partnership project (3GPP) technical specification (TS) 38.213 specified that UE reports 1-4 beams within a single CSI report according to the radio resource control (RRC) parameter nrofReportedRS. Certain embodiments provide an ML method that may find a best performing beam when 1-4 best beams are known for the UE. If the gNB is learning, the UE may report up to four best beams within CSI. If the UE is learning, the UE may report only one beam given by its ML model.

Certain embodiments focus especially on beam selection for a DRB, or a set of DRBs, with a certain type of data to be carried. If the gNB wants to boost throughput, then only a single model suffices. However, a separate model may be used alongside, for example for latency critical DRBs. Even though the models can be mostly identical, reward functions can be different. For example, best effort data may benefit from, for example, having a throughput-based reward. By contrast, for another example, latency critical data may benefit from having reward based on protocol data unit (PDU) delay as well as transmission buffer status.

Certain embodiments, therefore, may address ML-based beam selection for latency critical data. Certain embodiments may also address a neural network based implementation embodiment. Moreover, as explained below, certain embodiments can be applied for different QoS classes by selecting reward function accordingly.

In certain embodiments, an ML agent, which may be located either at the UE or at the gNB, can observe PDU, for example packet data convergence protocol (PDCP) PDU, delays during an observation window. The observation window may be based on, for example, CSI reporting periodicity. The PDU delay may be the time between packet arrival and successful reception. The PDU may be, for example, PDCP and/or radio link control (RLC) PDU. In addition to PDU delays, the transmission buffer status can be monitored. In order to minimize delays, it may be beneficial to have transmission buffers as empty as possible.

Thus, for example, a reward function including delay and buffer status terms could be as follows:

$$r = \begin{cases} PDB - \left(\frac{d_{sum}}{n}\right), & \text{if first case} \\ -10 * PDB, & \text{if second case} \end{cases}$$

where the first case is if PDUs are transmitted/received, where the second case is if data exists in transmission buffer, but none transmitted/received, where n is number of received/transmitted PDUs and $d_{sum}$ is accumulated sum of PDU delays within observation window. Such an approach may be useful for learning beam selection for latency critical DRBs or QoS classes.

Figure 3:
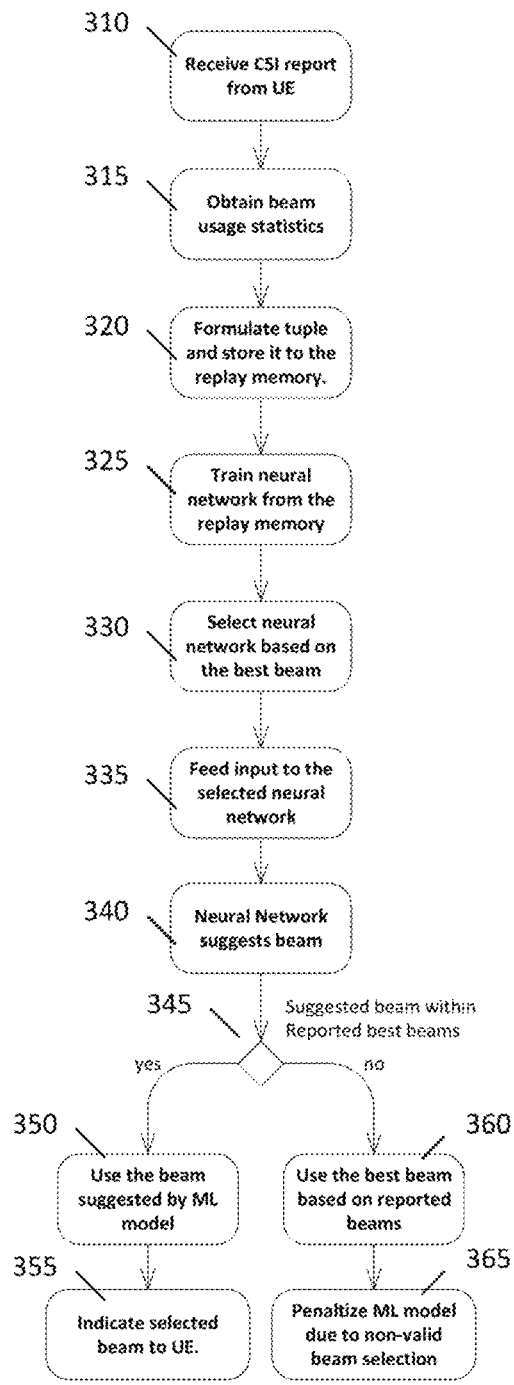
FIG. 3 illustrates an example of transmission/reception beam selection implemented with a neural network, according to certain embodiments.

FIG. 3 illustrates an example of transmission/reception beam selection implemented with a neural network, according to certain embodiments.

As shown in FIG. 3, at 310 a CSI report from a UE can be received at a gNB. The CSI report can include, for example, from one to four best beams and an RSRP value at least for the best beam. Other RSRPs, if provided by the UE, may be provided as differential values, for example relative difference to the best RSRP.

At 315, the gNB can obtain beam usage statistics. The gNB can obtain statistics about the recent usage counts for each beam. The gNB may keep track of such statistics in any desired way. If the UE is implementing the ML model, the gNB can provide the statistics to the UE, for example using a periodic broadcast to ML capable UEs.

At 320, the gNB can formulate a tuple and store the tuple to replay memory. The tuple can include, for example, the following: a previous state of the UE; a previous action for the UE including, for example, a beam selection ID; a reward, for example accumulated UE throughput, packet delay, and/or buffer status; and a state, for example a neural network (NN) input vector including beam usage values per beam and RSRP.

At 325, the gNB can train the neural network from the replay memory. For example, a number of epochs can be looped through, and random tuples can be selected for training batches on each epoch.

At 330, the gNB can select a neural network based on a best beam. There may be a separate small neural network for each gNB beam ID.

At 335, the gNB can feed input into the selected neural network. The input can be, for example, a normalized number of how many times a certain gNB beam was scheduled within a time window, for example between CSI reports.

At 340, the neural network can suggest a beam. In order to obtain a suggestion, neural network forward propagation can be done with the latest state NN input vector.

At 345, the gNB can determine whether the beam suggested by the neural network is within the beams reported as best by the UE. If so, then at 350 the gNB can use the beam suggested by the ML model. Optionally, at 355, the gNB can indicate the selected beam to the UE.

The indication to the UE, while not mandatory, may help the UE to change the UE's beam/panel to a better matching beam/panel, if the gNB chooses to use other than the best beam the UE reported. As an example, a DCI or MAC CE with 6 bits may be able to indicate a selected one of 64 beam IDs. The number 64 is an example taken from 5G specifications.

Otherwise, if the beam suggested by the ML model is not one of the reported best beams, the gNB may, at 360, use the best beam reported based on the reported beams. Moreover, at 365, the gNB may penalize the ML model due to non-valid beam selection.

The penalizing may allow the ML model to obtain feedback for a disqualified output. The beam can be deemed disqualified if the RSRP is not reported for that beam or if the RSRP is reported but is below a threshold.

If neural networks are used for learning, small neural networks can be used for each gNB beam. It is also possible to use a single neural network. Using small neural networks can be used to make sure that, for each CSI input, as optimal as possible beam selection can be made. For example, each beam may have a different set of other beams that are spatially correlated. Additionally, back and forward propagation processes of a neural network may become less demanding for the processor performing ML. Moreover, a single processor can be used to efficiently process multiple neural networks parallel on different cores/threads.

As illustrated in FIG. 3, neural network used for determining gNB beam to be used can be selected based on CSI report indicating the best beam. In other words, the neural network corresponding to the best beam in CSI report can be selected. The neural network can output a suggestion for beam to be used. The suggested beam may be the same or different than the best based on measurements. If the suggested output is within the best beams reported by the UE, then that beam can be used. Otherwise, the best of the reported beams can be.

Figure 4:
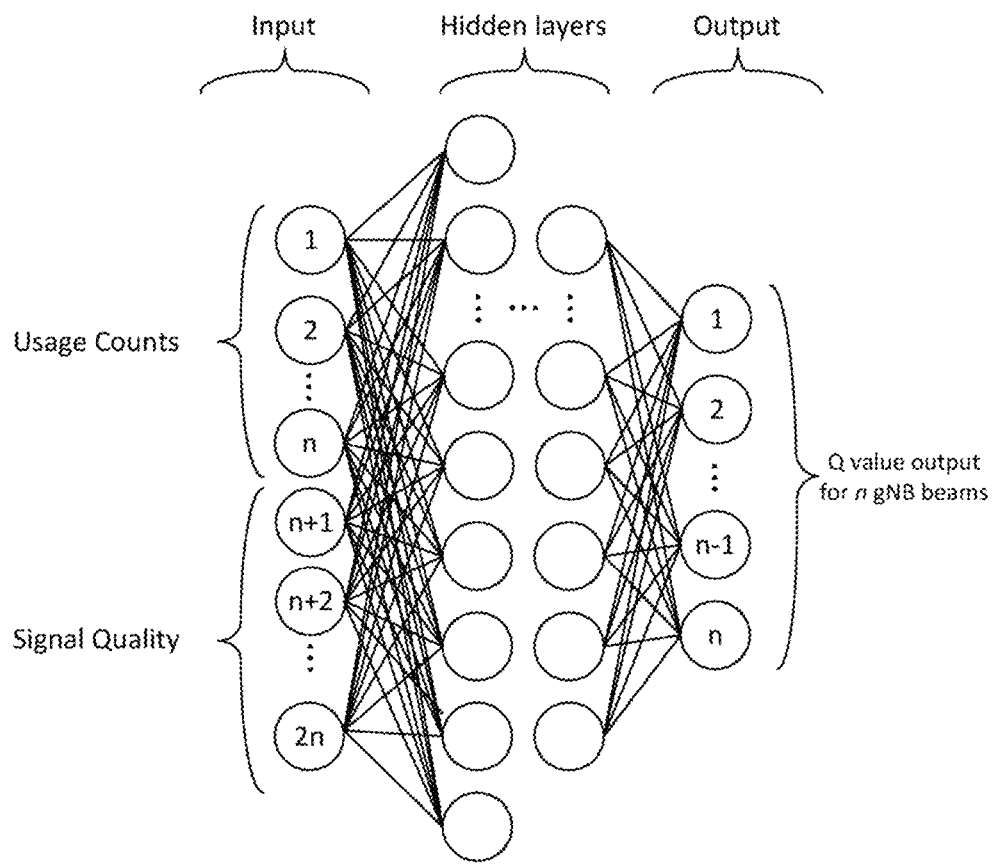
FIG. 4 illustrates an example of a neural network, according to certain embodiment.

FIG. 4 illustrates an example of a neural network, according to certain embodiment. The example of neural network of FIG. 4 may be capable of learning and providing beam selections that outperform conventional measurement-based approaches.

Thus, an example of a neural network capable learning beam selections is illustrated in FIG. 4. The input of the network can include, at inputs 1 to n, usage counts for each gNB beam, as well as, at inputs n+1 to 2n, user reported RSRP values. Beam usage information may be, for example, the number of times a certain beam was used for all or high priority data. Such information may be available at gNB by implementation of, for example, storage of statistical data, as mentioned. If UE's ML model wants to use such information, then gNB may, for example, broadcast such information at least to ML-capable UEs. For example, a machine learning radio network temporary identifier ML-RNTI may be defined for such use. The high priority data may be, for example, certain set of QoS indices with stringent delay and/or reliability targets. Values can be scaled to be between −1 and 1 in order to stabilize neural network forward and backward propagation calculations. Beam usage for an $i^{th}$ beam can be derived from scheduling counts: $count_i/count_{max}$. If there are beams without usage or without RSRP values, the values can be zeroes. If the RSRP values are known from differential values, the RSRP values can be calculated before being normalized.

In addition to usage counts, a second set of inputs can be signal quality, such as user equipment reported RSRPs, for example, for 1-4 best beams. The value range may be from −140 to −44 dBm scaled, to −1 to 1.

The neural network can output a Q value for each gNB beam index. The beam with highest Q value may be expected to yield the highest performance. The highest performance can be, for example, the lowest packet delay or highest throughput depending on used reward function.

Figure 5:
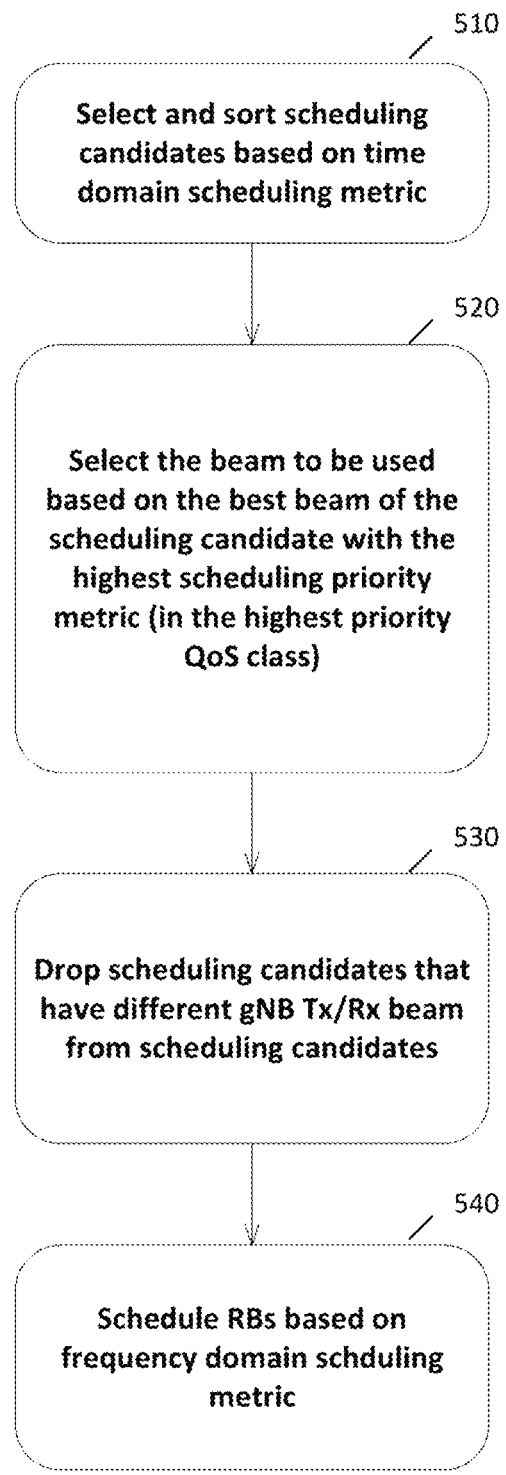
FIG. 5 illustrates a simulation method for simulating a method according to certain embodiments.

FIG. 5 illustrates a simulation method for simulating a method according to certain embodiments. Accurate system level simulations can demonstrate the principles of certain embodiment. The simulation scenario described by FIGS. 5, 6, 7, and 8 follows 3GPP guidelines for dense urban macro scenario. In this simulation, 21 base stations had 14 beams each. Simulations used 50 MHz bandwidth at 30 GHz mmW FR2 band. UE moving speed of 3 km/h was used. Only a single radio frequency (RF) chain limiting the number of simultaneous Rx/Tx beams to a single one was used. Frequency domain scheduling was performed with the UEs that had the same gNB Tx/Rx beam. Two types of UEs, URLLC and eMBB, were randomly dropped within the simulation area. 378 URLLC UEs transmitted/received 50 B packets for UL/DL according to file transfer protocol (FTP) 3 traffic model with 2 ms packet inter-arrival time. 42 eMBB UEs had full buffer traffic model for both DL and UL. Scheduling in time and frequency domains was prioritizing URLLC UEs in order to minimize their latency. CSI reporting periodicity was constantly 5 ms. It was assumed that each CSI report included 1 or 4 best beams and measured RSRP at least for the best beam.

Scheduling method used by the simulator is shown in FIG. 5. First, at 510, a time domain scheduler sorted scheduling candidates based on their time domain scheduling priority metric. Then, at 520, the gNB selected the beam used to Tx/Rx in upcoming TTI based on the best beam selected for the scheduling candidate with the highest time domain priority metric. UEs that fall within different gNB Tx/Rx beams were removed from the pool of scheduling candidates at 530. Finally, at 540, frequency domain resource blocks were shared based on frequency domain scheduling metric.

The beam to be used within a scheduled TTI was selected first based on QoS priority of scheduling candidates and secondly based on scheduling priority metric priority, if all candidates belonged to the same QoS class.

In order to generate converged enough neural networks, the learning algorithm was first run with 10% random exploration rate. Thus, on average every 10th beam selection was random. The other 90% of beam selections were based on ML suggestions. The simulated method already outperformed measurement-based beam selection with such random exploration rate. This may be mainly because random selection was only from a limited pool of beams reported by the UE.

Once a neural network(s) is/are converged enough, random exploration may be stopped or reduced to a small number such as 1%. After that, the model may still store the model's experiences to replay memory and keep continuously updating the model without random exploration. Experience tuples can include two consecutive states, as well as reward and action for the first state. As there may be multiple neural networks, model updating from the replay memory can be done in parallel for each beam with a multi-core/thread processor.

Figure 6:
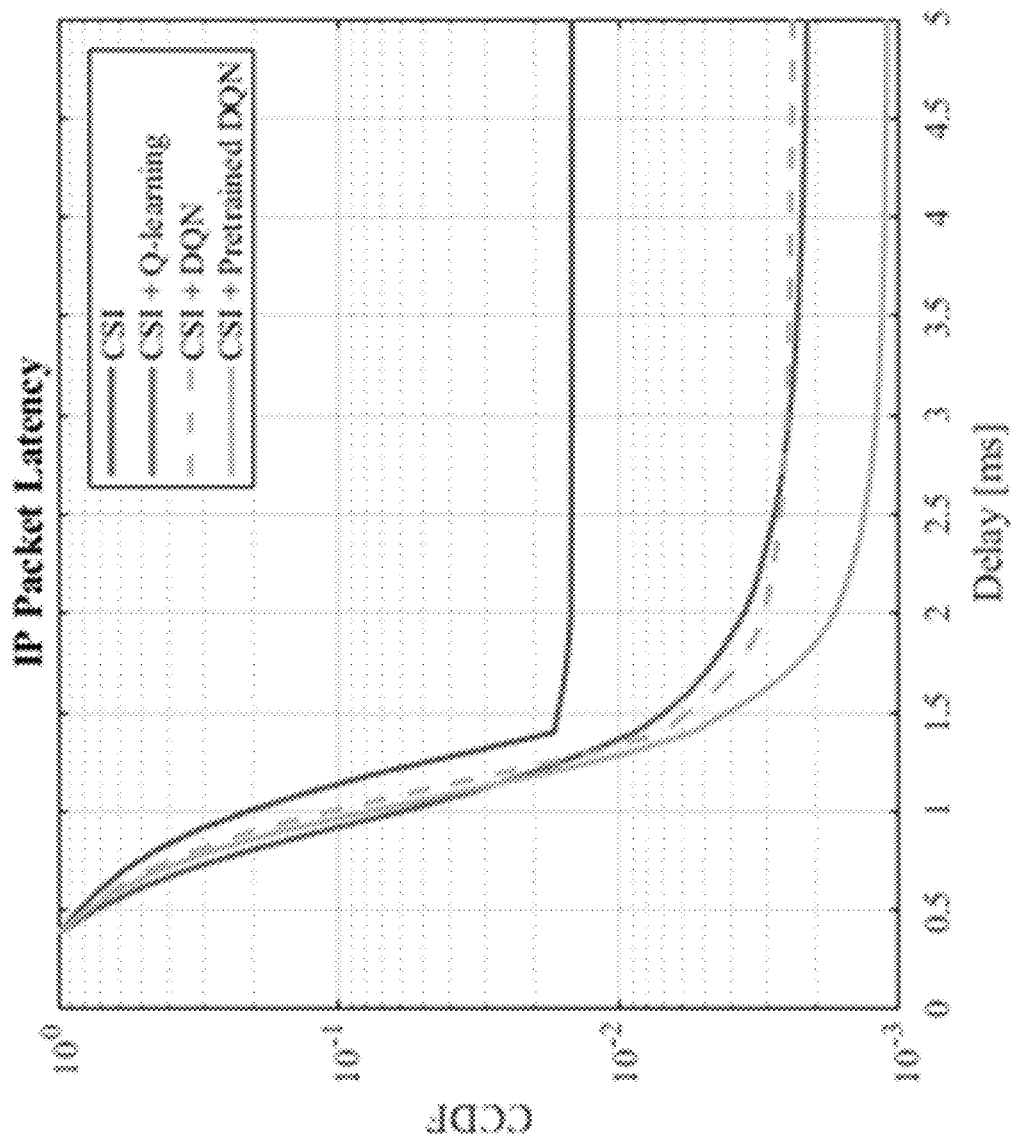
FIG. 6 illustrates performance gain, according to certain embodiments.

FIG. 6 illustrates performance gain, according to certain embodiments. More particularly, FIG. 6 illustrates performance gain when a model according to certain embodiments is used for latency critical UEs with a reward function, as described above. The DQN option utilizes beam usage information as an additional input, which can give further insight which beams should be selected.

As shown from the simulation data in FIG. 6, the ML methods achieved lower delays as well as higher reliability compared to beam selection that is only CSI based, namely only based on beam quality/power measurements. Such improvements may allow a network to increase the capacity of latency critical UEs.

Figure 7:
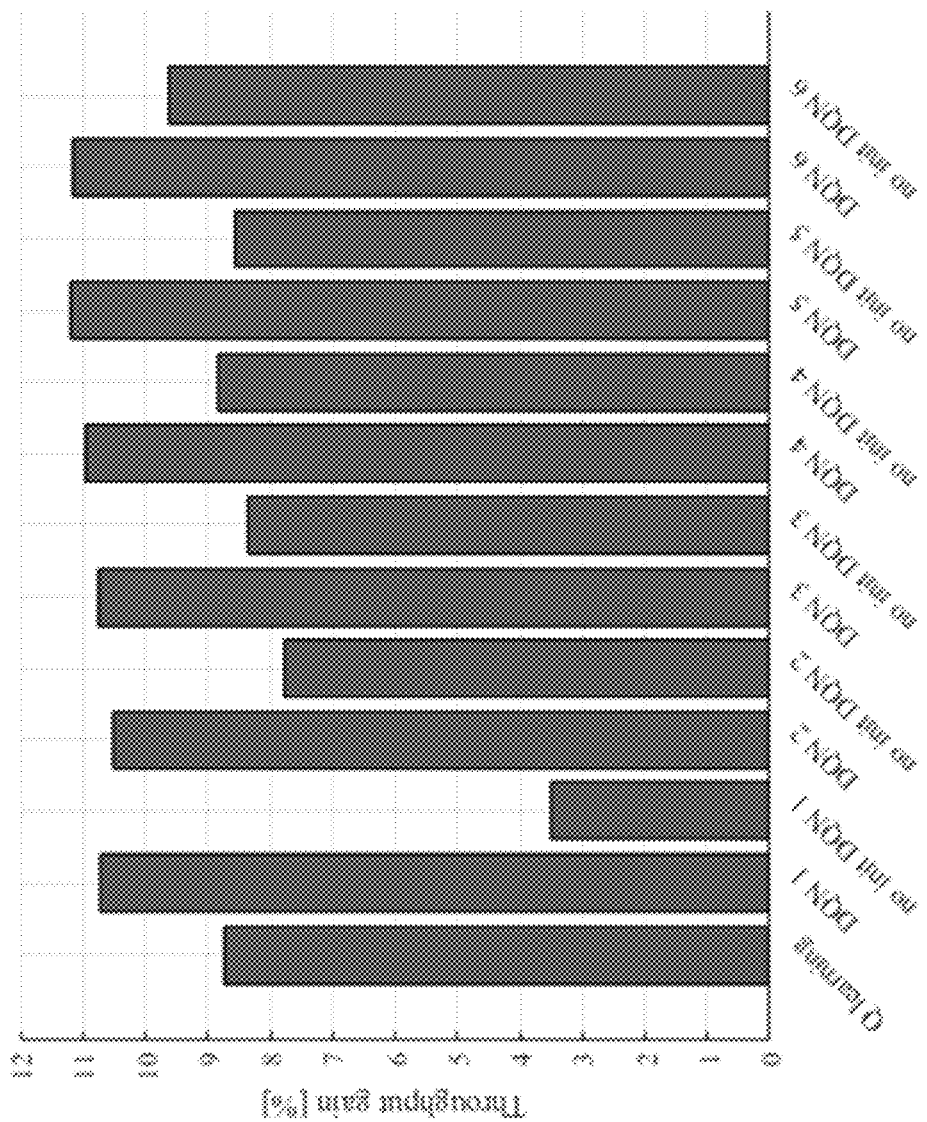
FIG. 7 illustrates further performance gain, according to certain embodiments.

FIG. 7 illustrates further performance gain, according to certain embodiments. More particularly, FIG. 7 illustrates performance gain and DQN's ability to continuously improve performance when the model of certain embodiments is used for best effort UEs with a throughput based reward function. In this simulation example, beam usage information was used as an additional input for DQN. Simulation bandwidth was only 50 MHz. With higher bandwidths that may be available on millimeter wave (mmW) frequency range FR2, higher throughput gains are expected.

More specifically, FIG. 7 illustrates cell throughput gains over measurement-based beam selection after 1-6 DQN training iterations. "No init" in FIG. 7 refers to a starting simulation run without extensive warm-up exploration. The "no init" example confirms that once trained model exists the model does not need to run heavy exploration that could slightly decrease network performance momentarily. Significantly higher throughputs for best effort UEs can be achieved with ML methods that are not only relying on beam quality/power measurements.

Figure 8:
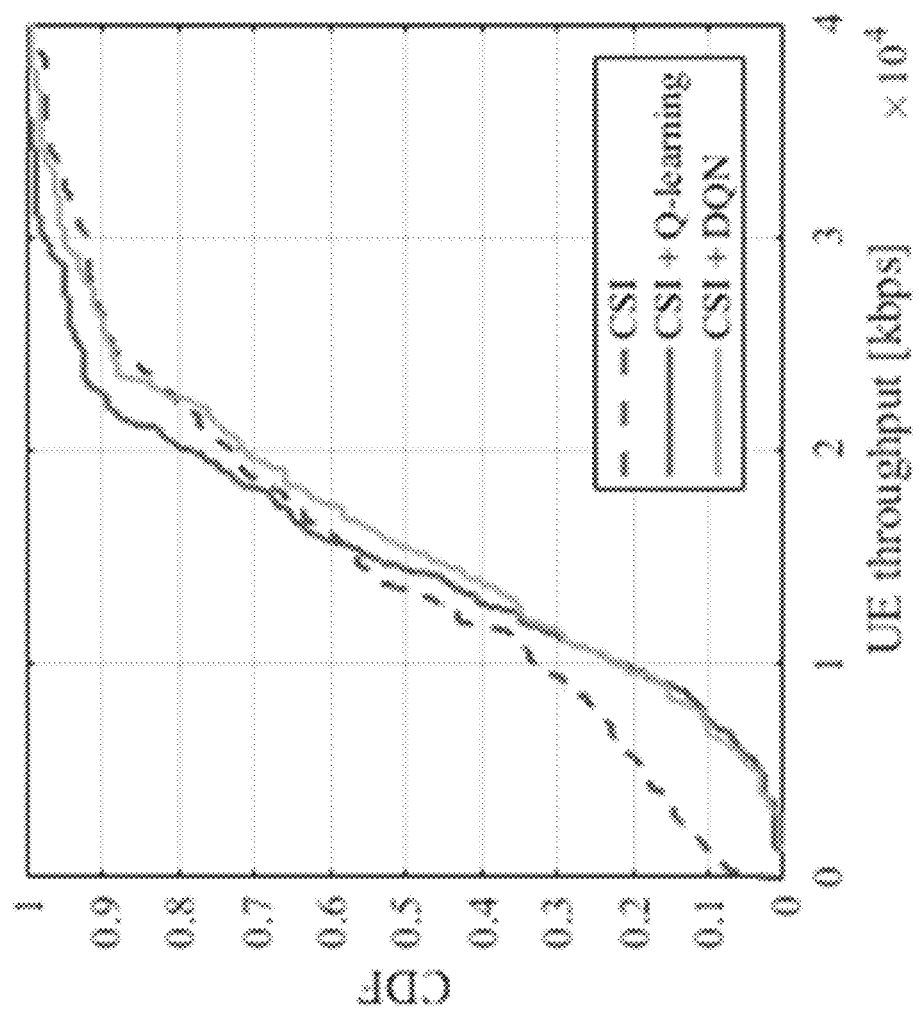
FIG. 8 illustrates throughput according to certain embodiments.

FIG. 8 illustrates throughput according to certain embodiments. In FIG. 8, UE throughput distribution is compared between CSI-based and ML alternatives. Worst performing best effort UEs may be the ones that are not getting resources, because gNB is prioritizing beams pointing towards latency critical UEs. If learning utilizes DQN implemented with methods of certain embodiments, it may be able to learn beam selection that perform well as to throughput for the distribution. The learning can provide high gains for the worst performing UEs and may not cause significant throughput degradation for the best performing UEs. Q-learning alternative using certain embodiments may do a similar job, but may not be able to take as much input information into account as trained DQN can. Nevertheless, Q-learning and DQN are used in FIG. 8 for illustrating gains of certain embodiments that may be agnostic to exact learning method.

More particularly, FIG. 8 illustrates best effort UE throughput distribution. Certain embodiments of ML methods may especially help increasing worst percentile throughputs, thereby saving UEs from unacceptable service.

In addition to throughput and latency improvements, certain embodiments may also improve energy efficiency. If more UEs can be served within the same TTI, as illustrated in simulations, certain embodiments may help lowering the amount of transmissions in the time domain and shortening transmission times, which may also reduce gNB/UE energy consumption.

Certain embodiments may contain any of the following aspects in any combination. For example, certain embodiments may have a DRB or DRB group specific ML model, which may be used for beam selection. The model may determine the utilized serving beam for the DRB, for example only for latency critical DRBs or only for best effort DRBs. The beam selection model may use at least PDU delay values for beam selection. The beam selection model may use buffer status as an additional input for beam selection. The UE may be the model and the UE may report ML suggested beams for a certain DRB. The UE can indicate the DRB(s) for which the UE provides ML suggested beam selections. Such an approach may be implemented through an approach that involves standardization.

In certain embodiments, a gNB may have the DRB specific model. The beam selection model can use CSI reports as input. The model may suggest to use other than UE reported beam for a certain DRB. The UE can provide candidate beams for a certain DRB. The candidate beams may be, for example, n best beams based on measurements or all beams that exceed an RSRP threshold, or another measurement quantity threshold. DRB dependent ML obtained values in CSI reports may be implemented through standardization.

If the gNB has the beam selection model, then after selecting another serving beam than the UE reported gNB beam, in certain embodiments the gNB can indicate the other serving beam to be used to UE. For example, this may be signaled as 6 additional bits in DCI or a MAC CE. Such DL control information may be implemented through standardization.

Certain embodiments may involve obtaining beam usage information to be used as an input for a beam selection model. For example, a gNB can use beam usage statistics as an input to the gNB's beam selection model. The gNB can also broadcast ML related information, such as the gNB's beam usage data, with an RNTI, for example the ML-RNTI mentioned above. Such broadcast of an ML-RNTI may be implemented via standardization.

IF UEs have beam selection models, the gNB can broadcast or otherwise transmit beam usage information to one or more connected ML capable UEs. The UEs can utilize beam usage information as an input to their beam selection models. As mentioned above, such features may be implemented by standardization.

Beam usage information can, in certain embodiments, consider a beam of certain QoS indices only. The UE can use received beam usage information as an input for the UE's beam selection model.

Certain embodiments may have a separate neural network or model for each beam, antenna port, or antenna panel. Certain embodiments may select the model based on channel quality measurements, such as RSRP, SINR, RSRQ, and/or RSSI. For example, a beam ID can be selected to yield the best measurement result and a corresponding ML model can be selected to select beam ID to be used for upcoming transmissions and/or receptions.

Figure 9:
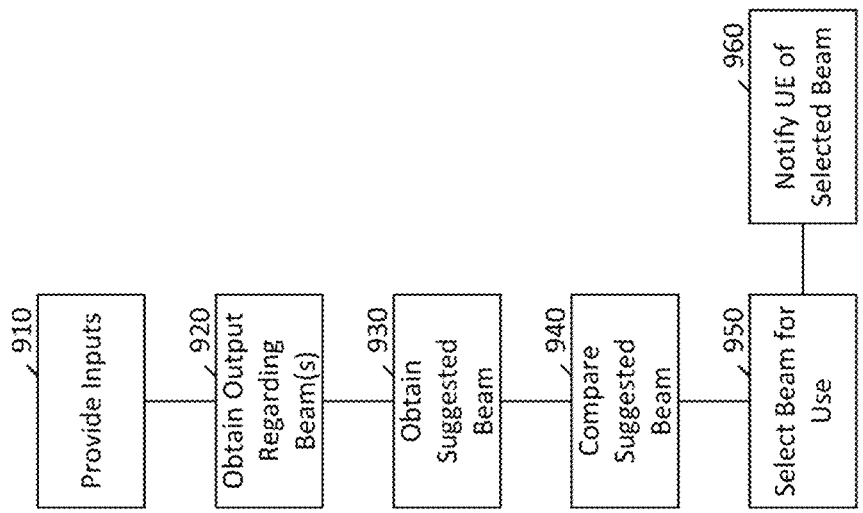
FIG. 9 illustrates an example flow diagram of a method, according to an embodiment.

FIG. 9 illustrates a method according to certain embodiments. The method of FIG. 9 can be performed by a gNB and/or a UE, as illustrated for example, in FIGS. 2, 3, and 5.

As shown in FIG. 9, a method can include, at 910, providing one or more inputs regarding a plurality of beams to a machine learning model. The machine learning model can be a data radio bearer specific machine learning model, a data radio bearer group specific machine learning model, or a model trained to output selectively data radio bearer specific values or data radio bearer group specific values. For example, a single model may be trained to output data radio bearer values and data radio bearer group values, at different times or in combination with one another. The inputs can include protocol data unit delay values. The inputs can also include buffer status. The inputs can further include usage statistics of a plurality of beams. The machine learning model can be in a next generation Node B, as in option #1, discussed above. In addition, or as an alternative, the machine learning model can be in a user equipment, as in option #2, discussed above. When the inputs include usage statistics of a plurality of beams and option #2 is followed, then the usage statistics can be received at the UE from the gNB, for example via a broadcast or other transmission. The method can also include, at 920, obtaining at least one output value regarding the plurality of beams from the machine learning model. For example, the machine learning model can provide an output value for each beam.

The method of FIG. 9 can further include, at 930, obtaining from the machine learning model a suggested beam on which a radio access network node is to transmit or receive radio communication with a user equipment. For example, when the model provides various output values corresponding to a variety of beams, a best beam may be selected based on the best output values. For example, in certain embodiments the model may output a suggested beam that gNB will use to transmit/receive to/from user equipment regardless of the location of ML model. If the model is in UE, then the suggestion can be indicated to gNB for example with a CSI report. If the model is at the gNB, then the gNB might just use the suggested beam. In that case gNB could indicate the beam to be used to UE, but not necessarily. The ML model may be used for selecting a UE beam, but UE beams may be up to UE implementation.

The machine learning model can be configured to select the suggested beam based on resulting latency or network capacity, regardless of the signal quality of the suggested beam being higher or lower than an alternative beam, for example even when the suggested beam has lower signal quality than an alternative beam. In certain embodiments, the model may simply ignore signal quality characteristics in its decision making Thus, the machine learning model may be unaware of whether the suggested beam has equal, superior, or inferior signal quality characteristics in comparison to any other alternative beam.

The method of FIG. 9 can additionally include, at 940, comparing the suggested beam to a report by the user equipment. This comparing may involve checking whether the suggested beam is contained in the report provided by the user equipment. For example, it can be determined whether or not the suggested beam is found in the report by the user equipment. The method can also include, at 950, selecting a beam for use based on the comparison or other check. When the suggested beam is included in the report, then the beam can be selected for use in accordance with the inclusion in the report. By contrast, when the suggested beam is not included in the report, then a beam from the report can be selected for use. If the report only includes one item, the ML suggestion may still make sense to be used. In such a case, the suggested beam may be used even if it is not found in the report. The method can further include, at 960, notifying the user equipment regarding the selected beam. When the suggested beam is not included in the report, the machine learning model can be penalized in accordance with the non-inclusion of the suggested beam in the report.

It is noted that FIG. 9 is provided as one example embodiment of a method or process. However, certain embodiments are not limited to this example, and further examples are possible as discussed elsewhere herein.

Figure 10:
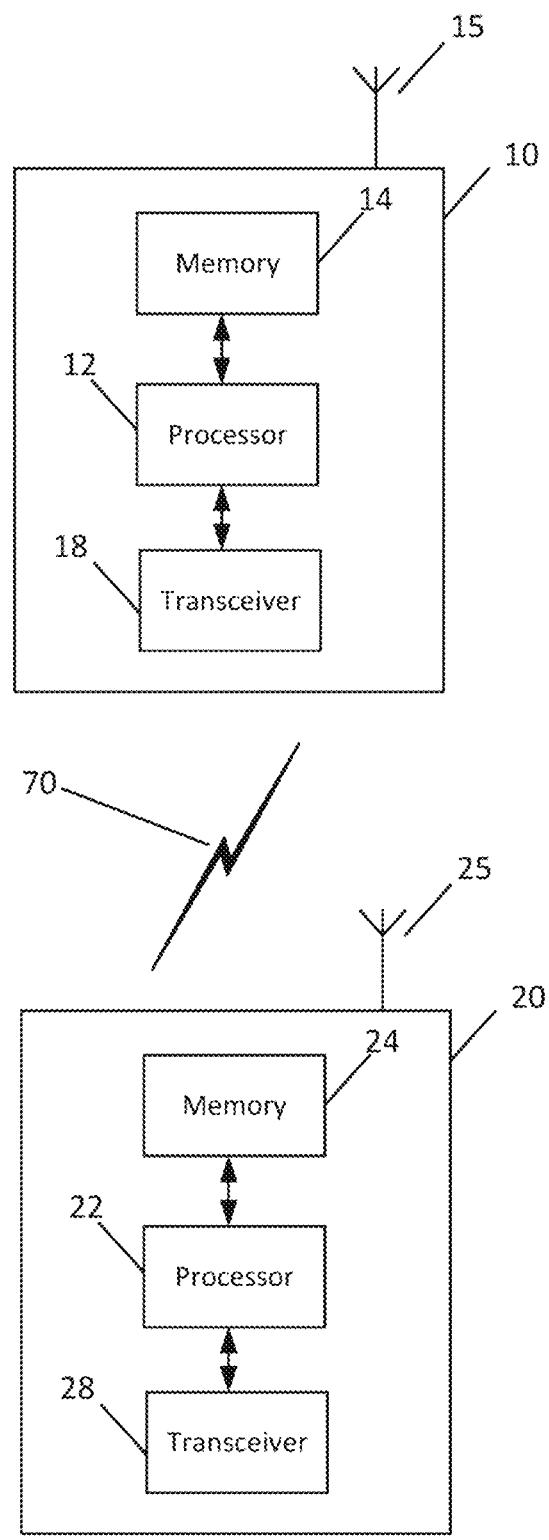
FIG. 10 illustrates an example block diagram of a system, according to an embodiment.

FIG. 10 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 10.

As illustrated in the example of FIG. 10, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 10, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-9, or any other method described herein. In some embodiments, as discussed herein, apparatus 10 may be configured to perform a procedure relating to providing beam selection using data radio bearer specific machine learning, for example.

FIG. 10 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10.

As illustrated in the example of FIG. 10, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-9, or any other method described herein. For example, in an embodiment, apparatus 20 may be controlled to perform a process relating to providing beam selection using data radio bearer specific machine learning, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may allow for control of beam selection in a data radio bearer specific way, thereby allowing greater throughput or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

CE Control Element
CSI Channel State Information
DCI Downlink Control Information
gNB 5G-NR Base Station
MAC Medium Access Control
ML Machine Learning
ML-RNTI Machine Learning Radio Network Temporary Identifier
mmW millimeter Wave
NR New Radio
RB Resource Block
RL Reinforcement Learning
RSRP Reference Signal Received Power
RSRQ Reference Signal Received Quality
RSSI Received Signal Strength Indicator
SINR Signal-to-Interference-Plus-Noise Ratio
TTI Transmission Time Interval
UE User Equipment

We claim:

1. An apparatus, comprising:
   at least one processor; and
   at least one memory including computer program code,
   wherein the at least one memory and the computer program code are configured to, with the at least one processor, cause the apparatus at least to
   provide one or more inputs regarding a plurality of beams to a machine learning model; and
   obtain at least one output value regarding the plurality of beams from the machine learning model,
   wherein the machine learning model comprises a data radio bearer specific machine learning model, a data radio bearer group specific machine learning model, or a model trained to output selectively data radio bearer specific values or data radio bearer group specific values.

2. The apparatus of claim 1, wherein the at least one memory and the computer program code are configured to, with the at least one processor, cause the apparatus at least to
   obtain from the machine learning model a suggested beam on which a radio access network node is to transmit or receive radio communication with a user equipment.

3. The apparatus of claim 2, wherein the machine learning model is configured to select the suggested beam based on resulting latency or network capacity, regardless of the signal quality of the suggested beam being higher or lower than an alternative beam.

4. The apparatus of claim 2, wherein the at least one memory and the computer program code are configured to, with the at least one processor, cause the apparatus at least to check whether the suggested beam is contained in a report by the user equipment;

select a beam for use based on the check; and notify the user equipment regarding the selected beam.

5. The apparatus of claim 4, wherein when the suggested beam is included in the report, then the beam is selected for use in accordance with the inclusion in the report.

6. The apparatus of claim 4, wherein when the suggested beam is not included in the report, then a beam from the report is selected for use.

7. The apparatus of claim 6, wherein the machine learning model is penalized in accordance with the non-inclusion of the suggested beam in the report.

8. The apparatus of claim 1, wherein the inputs comprise protocol data unit delay values.

9. The apparatus of claim 1, wherein the inputs comprise buffer status.

10. The apparatus of claim 1, wherein the inputs comprise usage statistics of a plurality of beams.

11. The apparatus of claim 1, wherein the machine learning model is in a next generation node B.

12. The apparatus of claim 11, wherein the at least one memory and the computer program code are configured to, with the at least one processor, cause the apparatus at least to provide the at least one output value to a user equipment.

13. The apparatus of claim 1, wherein the machine learning model is in a user equipment, and wherein the at least one memory and the computer program code are configured to, with the at least one processor, cause the apparatus at least to provide the at least one output value to a radio access node.

14. The apparatus of claim 13, wherein the inputs comprise usage statistics of a plurality of beams and wherein the usage statistics are received from the radio access node.

15. The apparatus of claim 14, wherein the machine learning model comprises separate neural networks for each beam of the plurality of beams.

16. A method, comprising:

providing one or more inputs regarding a plurality of beams to a machine learning model; and obtaining at least one output value regarding the plurality of beams from the machine learning model, wherein the machine learning model comprises a data radio bearer specific machine learning model, a data radio bearer group specific machine learning model, or a model trained to output selectively data radio bearer specific values or data radio bearer group specific values.

17. The method of claim 16, further comprising:

obtaining from the machine learning model a suggested beam on which a radio access network node is to transmit or receive radio communication with a user equipment.

18. The method of claim 17, wherein the machine learning model is configured to select the suggested beam based on resulting latency or network capacity, regardless of the signal quality of the suggested beam being higher or lower than an alternative beam.

19. The method of claim 17, further comprising:

checking whether the suggested beam is contained in a report by the user equipment;

selecting a beam for use based on the check; and notifying the user equipment regarding the selected beam.

20. A computer program embodied on a non-transitory computer readable medium, the computer program comprising computer executable code which, when executed by a processor, causes the processor to:

provide one or more inputs regarding a plurality of beams to a machine learning model; and obtain at least one output value regarding the plurality of beams from the machine learning model, wherein the machine learning model comprises a data radio bearer specific machine learning model, a data radio bearer group specific machine learning model, or a model trained to output selectively data radio bearer specific values or data radio bearer group specific values.

* * * * *